Oct. 22, 1935. B. C. ROEHRL 2,018,469
INTER-RELATED POWER TRANSMISSION CONTROL AND BRAKE MECHANISM
Filed July 12, 1933 2 Sheets-Sheet 2
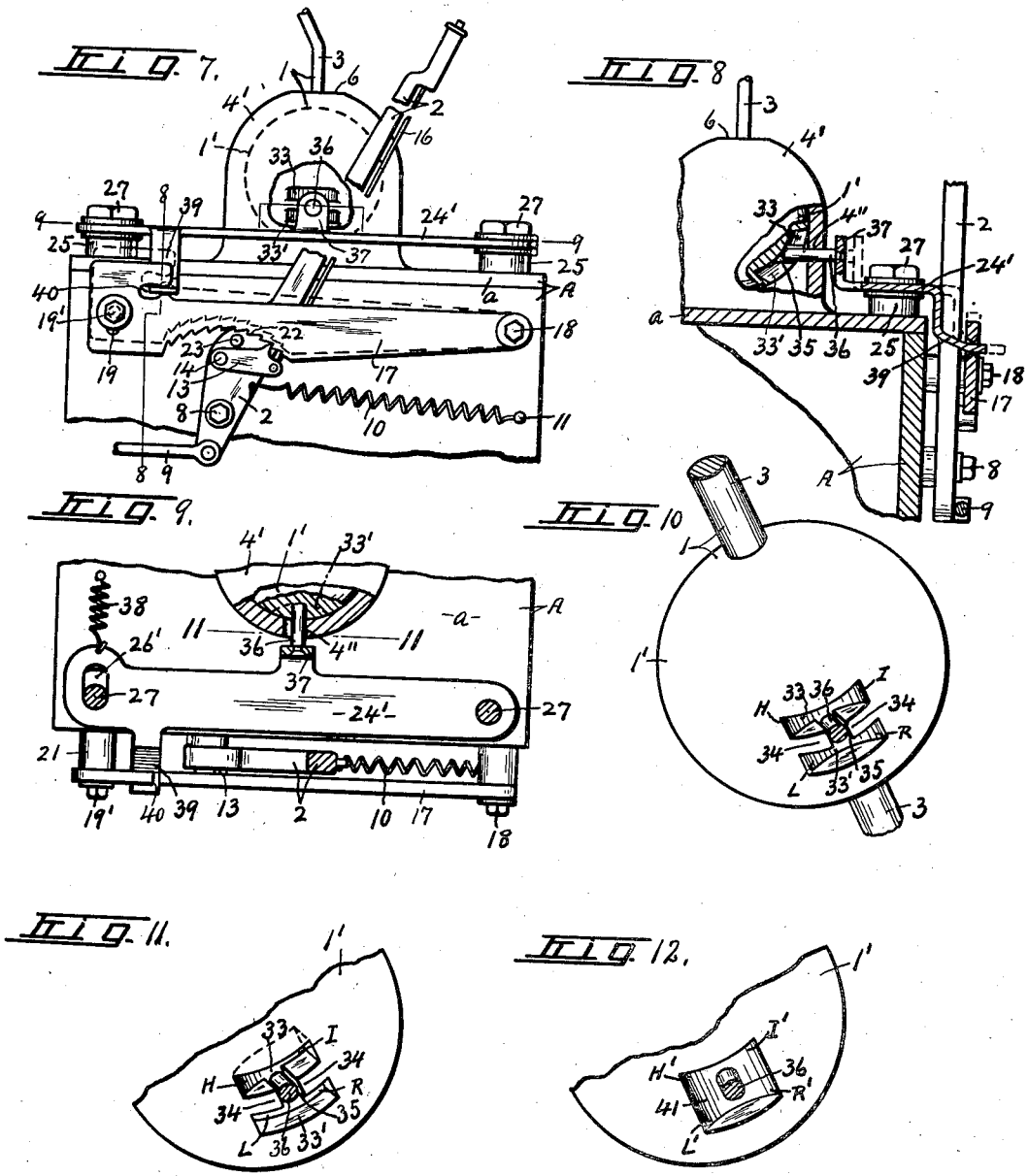

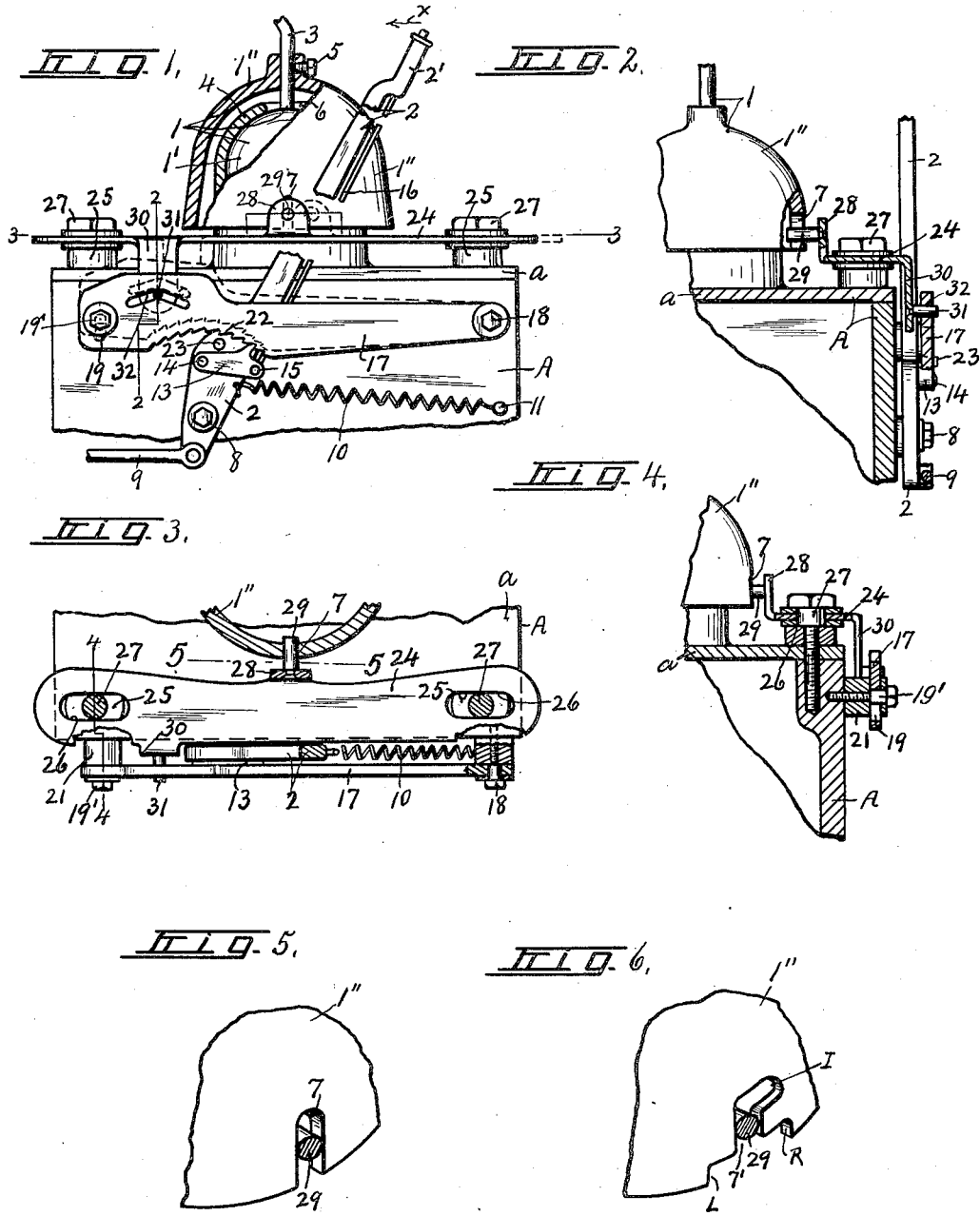

Patented Oct. 22, 1935

2,018,469

UNITED STATES PATENT OFFICE 2,018,469

INTER-RELATED POWER TRANSMISSION CONTROL AND BRAKE MECHANISM

Bruno Charles Roehrl, Binghamton, N. Y.

Application July 12, 1933, Serial No. 680,101

13 Claims. (Cl. 192—4)

This invention relates to an inter-related power transmission and brake mechanism for motor vehicles and other machines employing a shiftable drive controlling member for the power transmission mechanism and a manually operable brake controlling lever combined in a manner somewhat similar to that set forth in my pending application Serial No. 672,819, filed May 25th, 1933.

The former application is directed more particularly to means for preventing the operation of the drive controlling element from its neutral to its driving position in case the brake-controlling element was inadvertently left in its brake-applying position.

The main object of the present invention is to provide simple and efficient means whereby the shifting of the drive-controlling element from its neutral to its driving position will automatically release the brake-controlling element from its brake-applying position in case it should be inadvertently left in that position when starting the machine.

It frequently happens that the operator of the machine will endeavor to drive the same while the emergency brake-controlling element is in its brake-applying position, resulting in the burning out of the brake linings, overheating of the brake drums, and excessive strain upon the driving mechanism and, in the present invention, I have sought to overcome these objectionable results and at the same time to permit the operation of the drive-controlling element from its neutral to its driving position even though the brake-controlling element should be in its brake-applying position at the time of the shifting of the drive-controlling element to its driving position by utilizing the shifting of the drive-controlling element for releasing the brake-controlling element in case the latter should be inadvertently left in its brake-applying position at the time of starting.

Another object is to provide means whereby the drive-controlling element may be selectively shifted to various positions for different speeds forward or reverse drive with the assurance that either one of such shifting movements will automatically release the brake-controlling element from its brake-applying position.

Other objects and uses relating to specific parts of the device will be brought out in the following description.

In the drawings:—

Figure 1 is a side elevation, partly in section, of a variable speed power transmitting unit for motor vehicles showing a part of the drive-controlling element and the emergency brake-controlling element, the latter being partly broken away, together with other parts of the invention.

Figure 2 is a transverse vertical sectional view taken on line 2—2, Figure 1, showing a portion of the housing for the drive-controlling element in section.

Figure 3 is a horizontal sectional view taken in the plane of line 3—3, Figure 1.

Figure 4 is a detail vertical sectional view taken on line 4—4, Figure 3.

Figure 5 is an enlarged detail sectional view taken on line 5—5, Figure 3, showing more particularly the connection between the drive-controlling element and adjacent portion of one of the brake-releasing elements actuated thereby.

Figure 6 is a sectional perspective view similar to Figure 5, showing a slightly modified form of brake-controlling element.

Figure 7 is a side elevation similar to Figure 1, showing a modified form of drive-controlling element and also a modified mechanism actuated thereby for releasing the holding mechanism for the brake-controlling lever, the portion of the housing for the drive-controlling element being broken away to show the cams and stops in the periphery of the ball.

Figure 8 is a transverse vertical sectional view taken on line 8—8, Figure 7, in which a portion of the housing for the drive-controlling member is broken away.

Figure 9 is a horizontal sectional view taken on line 9—9, Figure 7.

Figure 10 is a perspective view of the drive-controlling element.

Figure 11 is an enlarged detail sectional view taken on line 11—11, Figure 9, showing more particularly the cams in the periphery of the spherical drive-controlling element.

Figure 12 is a perspective view similar to Figure 11 showing a modified cam on the periphery of the ball.

In Figures 1 to 4 inclusive, I have shown a gear case or frame A adapted to receive and support a variable speed power transmitting mechanism of any well-known construction commonly used in motor vehicles and not necessary to herein illustrate or describe, together with a drive controlling element 1, a brake-controlling element 2, means for holding the brake-controlling element in its brake-applying position, and means operatively connected to and actuated by the drive-controlling element when the latter is shifted from its neutral position to its driving position, and means operatively connected to and actuated by the drive-controlling element when shifted to its driving position for releasing said holding means and thereby permitting the brake-controlling element to be returned to its neutral position, as shown in Figure 1.

Drive-controlling element

The drive-controlling element may be of any suitable construction adapted to be shifted from a neutral position to one or more driving positions for effecting a corresponding shifting of the power transmitting mechanism, but in this instance, consists of a ball member 1' and a cap member 1'' both secured to a common arm 3 to form what may be termed a gear-shifting lever having its lower end adapted to be connected in any well-known manner to the power transmitting mechanism within the case A.

The ball member 1' is journaled in a relatively fixed spherical bearing member 4 which is mounted upon a removable top section a of the housing A.

The cap section 1'' extends around and over the top of the bearing 4 in spaced relation thereto to permit the necessary angular movement of the drive-controlling element and is secured to the arm 3 by releasable means such as the set screw 5, as shown in Figure 1.

The bearing 4 is provided with an opening 6 in its upper side to permit the passage of the arm 3 therethrough and is of sufficient diameter to allow the necessary angular movement of the drive-controlling element, see Figure 1.

As shown in Figures 1 to 5 inclusive, the cap section 1'' of the drive-controlling element is somewhat bell-shaped and arranged with its lower end in spaced relation to the top of the housing A to permit the necessary angular movement of the drive-controlling element, said cap section being provided with a vertical slot 7 extending upwardly from the lower edge thereof for receiving a part of the mechanism for releasing the holding means for the brake-controlling element 2, hereinafter described.

Brake-controlling element

The brake-controlling element 2 preferably consists of an emergency brake lever commonly used on automobiles and analogous motor vehicles and is shown as pivoted at 8 near its lower end to one of the upright sides of the housing A to extend upwardly therefrom, the lower end of said brake lever being pivotally connected to a suitable brake operating rod 9 which may be connected in any well-known manner to the brake mechanism of the automobile for applying the brakes when the lever 2 is moved rearwardly from its neutral position or in the direction indicated by arrow X, Figure 1.

This brake lever is preferably arranged in relatively close proximity to one side of but in spaced relation to the corresponding side of the housing A and cap section 1'' to extend above said cap section if desired, and is yieldingly held in its neutral position by means of a spring 10 having one end connected to a fixed anchorage 11 on the housing A and its other end attached to the lever 2 just above the pivot 8, as shown in Figure 1.

Brake locking and releasing means

Suitable means is provided for holding the brake-controlling element 2 in its brake-applying position against the action of the spring 10 and for this purpose a pawl or detent 13 is pivoted at one end at 14 to the brake lever 2 to extend forwardly therefrom and has its forward end pivotally connected at 15 to the lower end of an operating rod 16 which extends upwardly along the lever 2 and through a socketed head 2' thereof to be operated by hand when desired for releasing the pawl 13 from its holding position.

A rack bar 17 extends horizontally or forwardly and rearwardly across the outer face of the brake lever 2 and is pivoted at its forward end at 18 to the housing A, the rear end of said rack bar being provided with a vertically elongated slot 19 for receiving a guide pin or bolt 19' which is screwed into a threaded opening in the adjacent side of the housing A to permit free vertical movement of the adjacent end of the rack bar and also to hold it against lateral vibration.

A suitable washer 21 surrounds the bolt 19' between the adjacent end of the rack bar 17 and housing A to assist in guiding the free end of the rack arm in its vertical movement.

The intermediate portion of the lower edge of the rack bar 17 is provided with a toothed rack 22 concentric with the axis of the pivot 8 and adapted to be engaged by the pawl 13 as the brake lever 2 is rocked about the pivot 8 for holding said brake lever in its adjusted position against the action of the spring 10.

A stop pin 23 is secured to the brake lever 2 to project across the upper edge of the pawl 13 to limit the upward movement of said pawl when the rack arm 17 is rocked upwardly out of engagement with the pawl or to the position shown by dotted lines in Figure 1, in a manner presently described.

Brake-releasing mechanism

It frequently happens that the brake-controlling element or lever 2 will be inadvertently left in its brake-applying position when the drive-controlling element is shifted to one or the other of its driving positions, resulting in the burning of the brake linings, overheating of the brake drums, waste of fuel, and unnecessary strain upon the mechanism, and in order to avoid these objectionable results, suitable means is provided for rocking the rack bar 17 about its pivot to disengage its teeth 22 from the pawl 13 immediately upon the shifting of the drive-controlling element from its neutral position to one or the other of its driving positions.

As illustrated in Figures 1 to 5 inclusive, this brake-release mechanism comprises a bar or slide 24 extending horizontally above the top of the housing A and in a plane below the lower end of the cap section 1'' and has its opposite ends guided on suitable bearing posts 25 on the top of the housing A, said opposite ends being provided with elongated slots 26 for receiving guide bolts 27 which are preferably screwed in the upper ends of the posts 25 to hold the bar against vertical vibration or displacement while at the same time permitting it to move freely endwise.

The intermediate portion of the bar 24 is provided with an upturned flange 28 carrying a pin 29 which projects laterally into the slot 7 in the adjacent side of the cap section 1'', as shown in Figures 1 to 5 inclusive, whereby when the drive-controlling element 1 is shifted from a neutral position to any one of its driving positions, the engagement of the walls of the slot 7 with the pin 29 will cause a corresponding endwise movement of the bar 24.

This bar 24 is also provided near its free end with a pendant flange 30 carrying a laterally projecting pin 31 which engages in a V-shaped cam slot 32 in the rack bar 17 near the free end thereof, as shown more clearly in Figures 1 and 2.

The drive-controlling element 1 is adapted to be used in connection with any of the usual variable speed transmitting mechanisms, as for example those having three forward drive speeds and one reverse drive, and is, therefore, movable laterally in opposite directions from its neutral position and then forwardly or rearwardly according to the preselected speed required somewhat in the manner of the usual H shift.

In order to permit this lateral shifting movement in opposite directions, the slot 7 in the cap section 1'' is located some distance below the center of oscillation of the ball 1' and is of sufficient vertical height to permit this lateral shifting movement without disengaging it from the pin 29 so that when the lateral shift of the drive-controlling element is made in one direction or the other and then shifting forwardly or rearwardly, the walls of the slot 7 will still be in engagement with the pin 29 for effecting a corresponding endwise movement of the slide bar 24.

When the drive-controlling element 1 is in its neutral position and during the lateral movement thereof in either direction, the pin 31 on the slide bar 24 will be and remain at the apex of the angular cam slot 32, as shown in Figure 1, thereby holding the rack bar 17 in fixed relation to the pawl 13 to allow the brake lever 2 to be adjusted to and held in its brake-applying position against the action of the spring 10.

But, immediately upon the forward or shifting movement of the drive-controlling element 1 after it has been moved laterally in the manner described, the walls of the slot 7 acting upon the pin 29 will move the bar 24 endwise in a corresponding direction, thereby causing its pin 31 to ride against one or the other of the upper inclined walls of the slot 32 for rocking the free end of the rack bar upwardly and thereby causing its teeth 22 to dis-engage from the pawl 13 at which time the spring 10 will automatically return the brake lever 2 to its neutral or release position.

On the other hand, if for any reason the toothed rack 22 should remain in engagement with the pawl 13, when an attempt is made to shift the drive-controlling element 1 from its neutral position to one or the other of the driving positions, such movement will be prevented by reason of the fact that the pin 31 would then be in the apex of the angular slot 32 and thus prevent the disengagement of the rack bar from the pawl which, in turn, would hold the slide bar 24 against endwise movement, thereby locking the drive-controlling element 1 against forward and rearward movement through the engagement of the pin 29 with the walls of the slot 7.

In Figure 6, the cap section 1'' of the drive-controlling element is provided with a modified vertical slot 7', opposite branch recesses L and R at the lower end thereof, and an additional branch slot I at the upper end of the vertical slot for receiving the pin 27, said vertical slot being somewhat shorter than that shown in Figures 1 to 5 inclusive and representing the neutral position of the drive-controlling element relatively to the pin 29.

This modification is adapted to be used to operate the brake-release mechanism from its brake-applying position in case said drive-controlling element should be shifted from its neutral to its high speed driving position and to permit the shifting of said drive-controlling element to either of its other positions without operating the brake release mechanism.

For example, the cap section 1'' is shown in its neutral position with the vertical slot 7' registered with the pin 29 but when the drive-controlling element is rocked laterally toward the left hand side of the vehicle, it will bring the branch recesses L and R into registration with the pin 29, thus permitting said element to be rocked rearwardly with the pin 29 in the branch recess L for low or first speed drive or the drive-controlling element may be moved forwardly to cause the pin 29 to enter the branch recess R for reverse drive.

If it should be desired to shift the drive-controlling element for intermediate or second speed drive, it will be rocked to the right to register the branch slot I with the pin 29 and then rocked forwardly to cause said pin to enter the branch slot I without effecting the operation of the brake-release mechanism.

On the other hand, if the drive-controlling element should be shifted laterally to bring the branch slot I into registration with the pin 29 and then moved forwardly, the opposite wall of the slot 7' would engage said pin and thereby shift the brake release mechanism to its released position to allow the brake-controlling element 2 to be returned to its neutral position before or at about the same time the machine is started.

In the modified construction shown in Figures 7 to 11 inclusive, the cap section 1'' shown in Figures 1 to 6 inclusive is omitted and the means actuated by the drive-controlling element for releasing the brake-controlling element from its brake-applying position is actuated directly from the ball section 1' while the bearing as 4' is provided with an opening 4'' for receiving a part of the brake-release mechanism presently described.

That is, the ball member 1' is provided with a pair of similar recesses or slots 33 and 33' extending inwardly from the periphery thereof some distance below its center, said ball being also provided with stop shoulders 34 between the recesses and arranged in spaced relation circumferentially to form an intervening slot 35 for the reception of a pin 36, as shown more clearly in Figures 8, 10, and 11.

The inner walls of the cam slots 33 and 33' are inclined from the center outwardly to the periphery to form corresponding cams adapted to engage the inner end of the pin 36 when the drive-controlling element 1 is shifted to different driving positions, the pin forming a part of the modified brake-releasing mechanism presently described.

This modified brake-releasing mechanism comprises, in this instance, a rock arm or bar 24' having one end pivotally mounted upon one of the posts 25 through the medium of the adjacent bolt 27, the other end of said bar being provided with a laterally elongated slot 26' for receiving the adjacent bolt 27, said bolt 27 serving to hold the bar 24' against vertical vibration while permitting it to oscillate freely about its pivotal bolt.

The pin 36 is mounted upon an upturned flange 37 on the intermediate portion of the rock arm or lever 24' which is yieldingly held in its innermost position by means of a spring 38, Figure 9, to keep the inner end of the pin 36 in contact with one or the other of the cams 33 or 33' or with the inner wall of the slot 35 according to the position of the drive-controlling element 1.

The rock arm or lever 24' is also provided near its free end with a downwardly and outwardly inclined cam member 39 having its outer end extended into a slot 40 in the rack bar 17 which otherwise is quite similar to that shown in Figures 1 to 4 inclusive.

The inner cam walls of the receses 33 and 33' are preferably concentric vertically with the center of oscillation of the ball member 1', as shown more clearly in Figure 8, but as previously stated are inclined outwardly horizontally from their central portions to form opposite cams, H and I, and L and R.

When the drive-controlling element 1 is in its neutral position as shown in the drawings, the pin 36 will be midway between the cam slots 33 and 33' or rather between the stop shoulders 34.

The opposite ends of the inner wall of the cam slot 33' constitute respectively low speed, reverse drive cams L and R, while the opposite ends of the inner walls of the other cam slot 33 constitute respectively high and intermediate speed drive cams H and I.

When it is desired to drive the vehicle, the drive-controlling element 1 will be shifted to bring the low speed cam L into engagement with the inner end of the pin 36 or it may be shifted to bring any one of the other cams I, H or R into engagement with the same pin and in either case the effect would be to rock the arm 24' about the axis of its pivot to cause the cam 39 to engage the upper wall of the slot 40 for lifting the rack bar 17 out of engagement with the pawl 13, permitting release of the brake-controlling element 2 from its brake-applying position by the spring 10.

It will be noted that the free end of the cam 39 is slidably engaged with the lower and upper walls of the slot 40 and it, therefore, follows that in case the brake-release mechansm should fail to be operated in the manner described, it would prevent the operation of the drive-controlling element 1 to either of its driving positions by reason of the fact that the bar 24' would then be held against lateral movement which, in turn, would cause any one of the cams L, I, H or R to wedge against the inner end of the pin 36 and thus prevent the shifting of the drive-controlling element until the brake mechanism was released.

In Figure 12 is shown a drive-controlling member 1' similar to that shown in Figures 7 to 11 inclusive except that the shoulders 34 are omitted and a single cam slot 41 takes the place of both of the cam slots 33 and 33', shown in Figures 10 and 11, but the operation is substantially the same as that for the structure previously described in that the back wall of the cam slot or recess is inclined outwardly from a medial line to form operating cams L' and R', I' and H' which function in the same manner as the cams L, R, I and H respectively, previously described.

The operation of the construction shown in Figures 1 to 6 inclusive and also that shown in Figures 7 to 12 inclusive have been previously described.

These constructions are particularly simple, practical and highly efficient for carrying out the object stated, but obviously some changes in the detail construction may be made without departing from the spirit of the invention.

What I claim is:

1. In an inter-related power transmission and brake mechanism for motor vehicles, a drive-controlling element shiftable from a neutral position to a driving position about a fixed center and provided with a cam movable therewith about said center, means for shifting said element, a brake-controlling element shiftable from a neutral position to a brake-applying position, releasable means for holding the second element in its brake-applying position, and means actuated by said cam when the first element is shifted from its neutral position to its driving position for releasing said holding means from its holding position.

2. In an inter-related power transmission and brake mechanism for motor vehicles, a drive-controlling element shiftable for a neutral position to a driving position, means for shifting said element, a brake-controlling element shiftable from a neutral position to a brake-applying position and provided with a detent, a toothed rack movable into and out of engagement with the detent for holding and releasing the second element in and from its brake-applying position, and means actuated by the shifting of the first element from its neutral position to its driving position for moving the rack out of engagement with the detent when engaged therewith.

3. In an inter-related power transmission and brake mechanism for motor vehicles, a drive-controlling element shiftable from a neutral position to a driving position, means for shifting said element, a brake-controlling lever shiftable from a neutral position to a brake-applying position, a pawl on the lever, a toothed rack movable into and out of engagement with the pawl for holding and releasing the lever in and from its brake-applying position, and means actuated by the shifting of the drive-controlling element from its neutral position to its driving position for moving the rack out of engagement with the pawl.

4. The combination with a power transmission mechanism having a controlling element shiftable from a neutral position to a driving position about a fixed center and provided with a plurality of cams movable therewith about said center, a brake-controlling element shiftable from a neutral position to a brake-applying position, of releasable means for holding the second element in its brake-applying position, and means actuated by each of said cams as the first element is moved from its neutral position to different driving positions for releasing said holding means from its holding position to allow the second element to be returned to its neutral position.

5. The combination with a power transmission mechanism having a drive controlling element shiftable from a neutral position to a driving position about a fixed center and having a slotted portion movable about said center, a brake-controlling element shiftable from a neutral position to a brake-applying position, of a movable member operatively connected to and actuated by the first controlling element as the latter is shifted from its neutral to its driving position, releasable means for holding the second element in its brake-applying position, and means actuated by the walls of said slotted portion for releasing said holding means from its holding position to allow the second element to be returned to its neutral position.

6. The combination with a power transmission mechanism having a controlling element shiftable from a neutral position to a driving position, a brake-controlling element shiftable from a neutral position to a brake-applying position, of a slide-bar operatively connected to and actuated by the first element as the latter is shifted from its neutral to its drive position, a pawl on the second element, a toothed rack movable into and out of engagement with the pawl, and means actuated by the slide bar for operating the toothed rack.

7. The combination with a power transmission mechanism having a controlling element shiftable from a neutral position to a driving position about a fixed center and having a slotted portion movable therewith about said center, a brake-controlling element shiftable from a neutral position to a brake-applying position, of releasable means for holding the second element in its brake-applying position, a slide bar operatively engaged with and actuated by the walls of the slotted portion as the first element is shifted from its neutral to its drive position, and means actuated by said slide bar for releasing the holding means from its holding position to allow the second element to be returned to its neutral position.

8. In an inter-related power transmission and brake mechanism for motor vehicles, a drive-controlling element shiftable from a neutral position to a driving position about a fixed center and having a slotted portion movable therewith about said center, means for shifting said element, a brake-controlling element shiftable from a neutral position to a brake-applying position, means for holding the second element in its brake-applying position, a movable member operatively engaged with and actuated by the walls of said slotted portion as the first element is shifted from its neutral position to its drive position, and means actuated by said movable member for releasing the holding means from its holding position to allow the return of the second element to its neutral position.

9. In an inter-related power transmission and brake mechanism for motor vehicles, a drive-controlling element shiftable from a neutral position to a driving position and having a spherical portion movable about its center and provided with a cam, means for shifting said element about said center, a brake-controlling element shiftable from a neutral position to a brake-applying position, releasable means for holding the second element in its brake-applying position, and means actuated by said cam for releasing the holding means from its holding position to allow the return of the second element to its neutral position.

10. In an inter-related power transmission and brake mechanism for motor vehicles, a drive-controlling element shiftable from a neutral position to a driving position, means for shifting said element, a brake-controlling element shiftable from a neutral position to a brake-applying position, a detent on the second element, a rack-bar movable into and out of holding engagement with the detent for holding and releasing the second element in and from its brake-applying position, a movable member operatively connected to and actuated by the first element as the latter is shifted from its neutral to its drive position, and means actuated by said member for moving the rack-bar out of engagement with the detent to allow the second element to be returned to its neutral position.

11. In an inter-related power transmission and brake mechanism for motor vehicles, a drive-controlling element shiftable from a neutral position to a driving position, means for shifting said element, a brake-controlling element shiftable from a neutral position to a brake-applying position, a detent on the second element, a rack-bar movable into and out of holding engagement with the detent for holding and releasing the second element in and from its brake-applying position and provided with a cam, and a slide operatively connected to and actuated by the first element as the latter is shifted from its neutral to its drive-position and operatively engaging said cam for moving the rack-bar out of engagement with the detent and thereby allowing the second element to be returned to its neutral position.

12. In an inter-related power transmission and brake mechanism for motor vehicles, a drive-controlling element shiftable from a neutral position to a driving position, means for shifting said element, a brake-controlling element shiftable from a neutral position, a detent mounted on the second element, a rack-bar movable into and out of engagement with the detent for holding and releasing the second element in and from its brake-applying position, to a brake-applying position, and a pivoted member operatively connected to and actuated by the first element as the latter is shifted from its neutral to its drive position and provided with a cam operatively engaging the rack-bar for moving the latter out of engagement with the detent and allowing the second element to be returned to its neutral position.

13. The combination with a power transmission mechanism having a controlling element shiftable from a neutral position to a driving position, a brake-controlling element shiftable from a neutral position to a brake-applying position, a detent on the second element, a rack-bar movable into and out of engagement with the detent for holding and releasing the second element in and from its brake-applying position, a second movable bar operatively connected to and actuated by the first element as the latter is shifted from its neutral to its driving position, and cam connections between said bars whereby the shifting of the second bar will move the first bar out of engagement with the detent.

BRUNO CHARLES ROEHRL.